Dec. 29, 1964    H. S. KUHN    3,162,940
METHODS OF MAKING CONDUIT EXPANSION JOINTS
Filed July 10, 1963    2 Sheets-Sheet 1
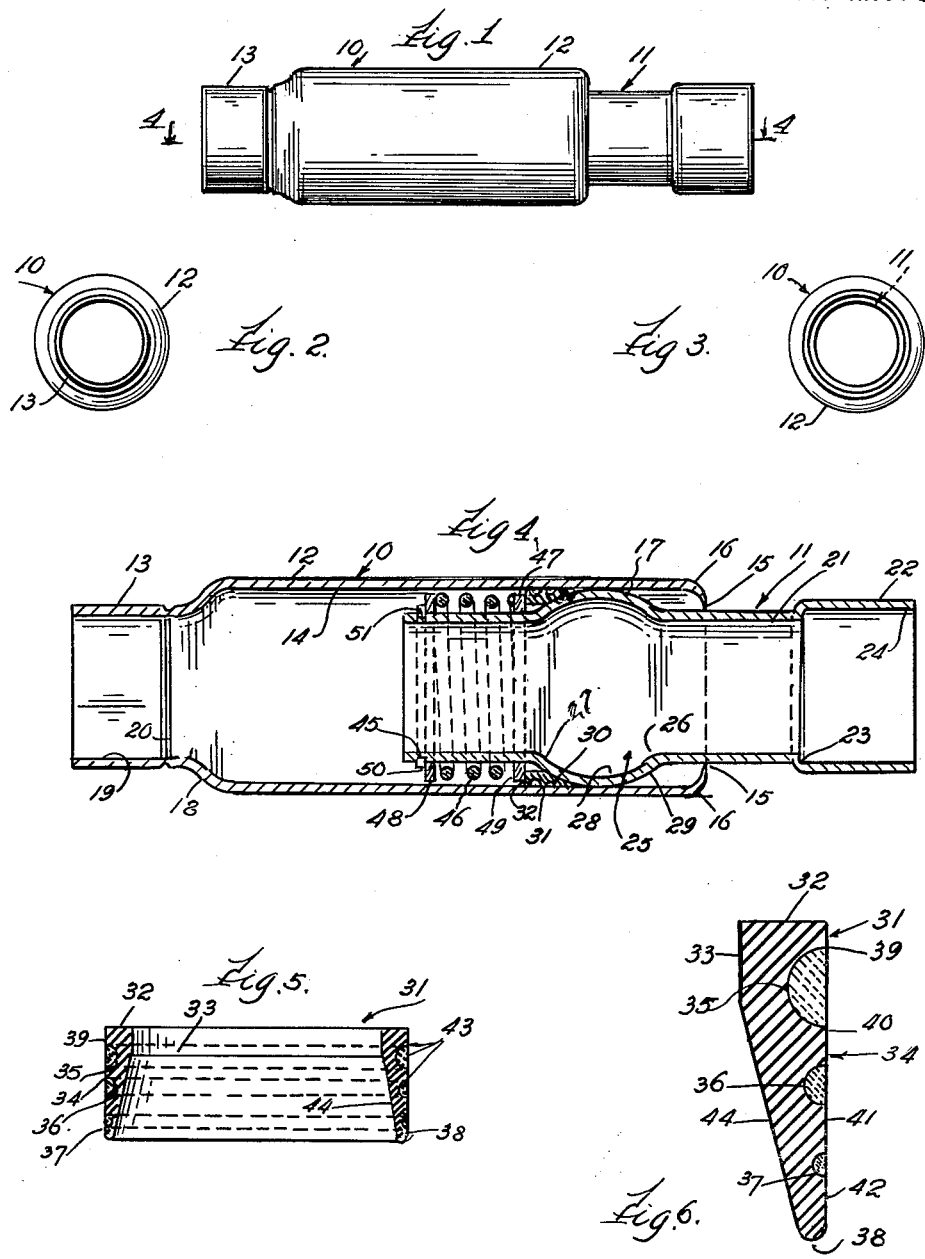
INVENTOR.
Henry S. Kuhn.
BY Robert H. Stendt.
Attorney.

Dec. 29, 1964  H. S. KUHN  3,162,940
METHODS OF MAKING CONDUIT EXPANSION JOINTS
Filed July 10, 1963  2 Sheets-Sheet 2

INVENTOR.
Henry S. Kuhn.
BY Robert H. Wendt.
Attorney.

United States Patent Office 3,162,940
Patented Dec. 29, 1964

3,162,940
METHODS OF MAKING CONDUIT
EXPANSION JOINTS
Henry S. Kuhn, Park Ridge, Ill., assignor to Rotherm
Engineering Company, Inc., Chicago, Ill., a corporation
of Illinois
Filed July 10, 1963, Ser. No. 294,120
7 Claims. (Cl. 29—421)

The present invention relates to conduit expansion joints, and is particularly concerned with the provision of an improved conduit expansion joint and improved methods of making conduit expansion joints, which are adapted to be used for connection to the pipes between two fluid filled heating units to permit expansion, contraction, rotation, and universal relative movement between them.

The present application relates to improvements in the joint disclosed in my prior Patent No. 2,845,283, issued July 29, 1938, and is a continuation in part of my prior pending application, Serial No. 146,167, filed Oct. 19, 1961, on Conduit Expansion Joints.

One of the objects of the invention is the provision of an improved expansion joint of the class described which is adapted to be manufactured more economically than the joints of the prior art, and which is adapted to eliminate certain troubles that were encountered in the prior art joints where the wedge type seal was sometimes found to adhere to the wall of the housing.

Another object of the invention is the provision of an improved expansion joint structure which is manufactured out of sheet metal pipe and the provision of an improved structure which can be manufactured more economically.

Another object of the invention is the provision of an improved expansion joint which has a minimum number of parts, which is simpler in construction, and which is adapted to be used for a long period of time without necessity for repair or replacement.

Another object of the invention is the provision of an improved method of making conduit expansion joints of the type adapted to be used for connection to the pipes between two fluid filled heating units to permit expansion, contraction, rotation, and universal movement between them.

Other objects and advantages of the invention will be apparent from the following description and the accompanying drawings, in which similar characters of reference indicate similar parts throughout the several views.

Referring to the two sheets of drawings accompanying this specification,

FIG. 1 is a side elevational view of an expansion joint embodying the invention;

FIG. 2 is an end view taken from the left end of FIG. 1;

FIG. 3 is an end view taken from the right end of FIG. 1;

FIG. 4 is a sectional view taken on the plane of the line 4—4, of FIG. 1, looking in the direction of the arrows;

FIG. 5 is a sectional view taken through the wedge seal, similar to FIG. 4, on a larger scale;

FIG. 6 is a fragmentary sectional view taken through the wedge seal, on a larger scale;

Figure 7:
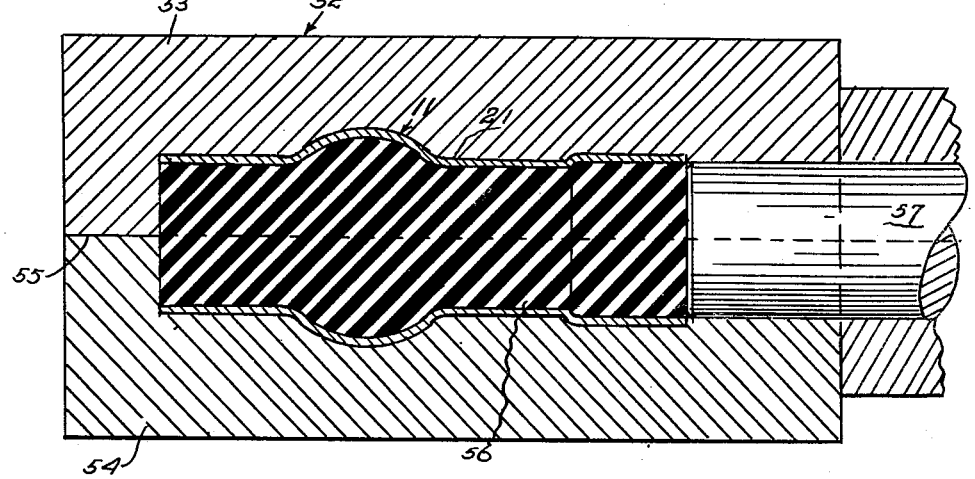
FIG. 7 is a sectional view taken on a plane passing through the axis of the ball sleeve, showing its method of manufacture.

The present expansion joint is preferably manufactured out of sheet metal copper tubing.

Referring to FIGS. 1–4, the expansion joint includes an outer housing 10 and an inner ball sleeve 11. The housing 10 has a cylindrical body 12 made of sheet metal copper tubing expanded from the size of the end portion 13 to the enlarged size indicated at 12.

The cylindrical body 12 has a smooth inner cylindrical surface 14 and at its right end (FIG. 4) it terminates in a relatively thin tapered portion 15, which is spun inward at 16 to form a stop flange. The stop flange will not pass the ball formation 17 of the ball sleeve 11; and this flange therefore limits the extension of the assembly and prevents it from being taken apart.

At its left end the housing 10 as an offset flange 18 which is joined to a tubular portion 13 of smaller diameter; and the tubular portion 13 is machined on the inside on the surface 19 to form a larger inside diameter and provide an annular shoulder 20.

The larger diameter 19 of the tube 13 is adapted to receive the pipe connecting the expansion joint to heating units which may be heated by vapor or other fluid; and the pipe which is inserted in the larger diameter 19 engages the shoulder 20, which determines its final position, where it is sweated to be joined to the housing 10 by suitable hard solder.

The ball sleeve 11 comprises a copper tube which is initially of the size of the neck portion 21, but is expanded from its original tubular form to the shape shown. At the right end (FIG. 4) the ball sleeve has an enlarged cylindrical portion 22 forming an annular shoulder 23 against which a pipe is seated, fitting in the enlarged inside diameter 24, where the pipe joining the expansion joint to another heating unit is secured by sweating it in with suitable hard solder.

The tubular neck 21 is integrally joined to a sheet ball formation 25, which is formed by expanding the metal of the tube in a suitable die from the bend 26 to the bend 27.

The ball formation has a partially spherical inner surface 28 and a partially spherical outer surface 29. The size of the outer surface 29 at its maximum diameter is such that it has a sliding fit against the smooth cylindrical surface 14 of the housing 10.

The space between the ball 25 and the cylindrical bore 14 at the left of the ball forms a wedge shaped space 30 of annular shape which is adapted to receive the wedge seal 31 shown on a larger scale in FIGS. 5 and 6. The wedge seal is made of resilient butyl rubber and is formed with a plane end surface 32, a short inner cylindrical surface 33, and a larger outer cylindrical surface 34.

The outer cylindrical surface 34 is provided with a plurality of grooves 35, 36, 37 of diminishing diameter toward the sharp edge 38; and this divides the cylindrical surface 34 into a plurality of sealing surfaces 39, 40, 41, 42.

Each of these sealing surfaces has a pair of sharp corners 43 forming lips which aid in sealing against the inner cylindrical surface 14.

The grooves 35–37 are filled with silicone lubricant, which is distributed over the outer surface of the wedge seal and the inner cylindrical surface 14 of the housing. The inside of the wedge seal 31 has a frusto-conical surface 44 extending from the inner cylindrical surface 33 to the sharp edge 38; and the butyl rubber seal is flexible enough so that the frusto-conical surface 44 assumes the partially spherical shape of the ball 25, where it engages the ball.

The ball 25 supports a tubular cylindrical extension 45 of the same size as the neck 11; and this is provided with a stainless steel compression spring 46, the end turns of which are tapered and flattened, as indicated at 47, to provide parallel ends for the spring.

The spring 46 has a plurality of turns; and its ends engage the two spring seat washers 48 and 49; and the washer 49 engages the flat surface 32 on the wedge seal.

The spring 46 has an initial compression; and the washer 48 is engaged by a stainless steel split ring 50 of rectangular shape in cross section and located in a complementary groove 51 so that the ring 50 projects from the groove and forms an abutment for engaging the spring seat washer 48.

The washers 48 and 49 are preferably made of laminated plastic or fiber; and they have a circular outer edge and a circular inner edge sliding freely on the reduced extension 45 and in the cylindrical bore 14. The washers 48, 49 may be slightly smaller than the bore 14, thus permitting universal pivoting movement of the ball 25 in the housing 10.

The spring constantly presses the wedge seal 31 into the wedge shaped space between the ball and the housing, maintaining a fluid-tight seal; and the ball sleeve 11 may rotate in the housing or it may slide back and forth to take up expansion or contraction of the pipes to which they are connected.

Figure 8:
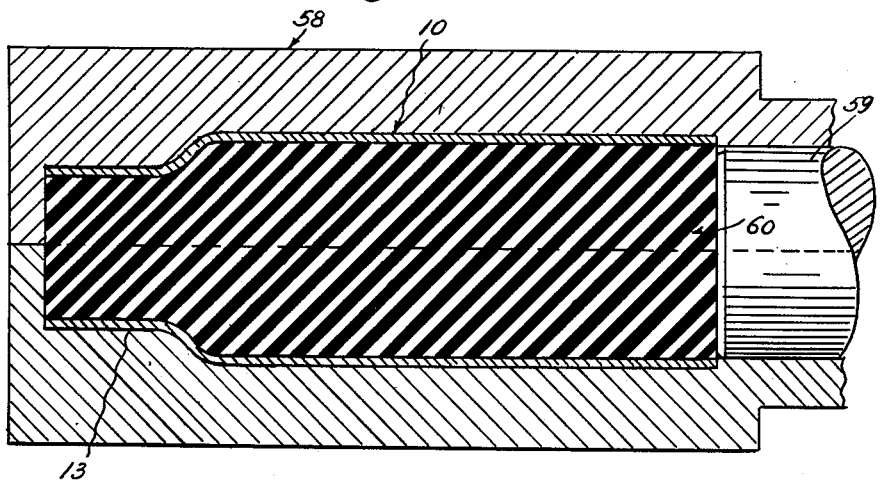
FIG. 8 is a similar view taken through the housing, showing the method of its manufacture.

Referring to FIGS. 7 and 8, these are digrammatic views showing the method of making the parts of the ball sleeve and the housing. In FIG. 7 the sleeve 11 is shown inside a split die 52, the parts 53 and 54 of which separate along the plane 55; and the parts are provided with a cavity conforming to the external shape of the ball sleeve 11 as it is shown in FIG. 4.

A copper tube of the size of the neck portion 21 is placed in the die; and it is filled with resilient rubber 56. After the die has been closed, hydraulic pressure is applied by means of a hydraulic ram 57, expanding the copper tube from the uniform diameter like the neck 21 to the final shape shown in FIGS. 4 and 7.

Referring to FIG. 8, this shows another die 58 containing the housing 10, which has been expanded in the die from the size indicated at 13 to the final shape and size of the housing 10 by means of a hydraulic ram 59 acting on the rubber 60.

The present expansion joints preferably have the inside of the housing 10 on the surface 14 provided with a flash coating of chromium, which aids in insuring the lack of adhesion between the wedge seal and the inner housing surface. Thus the present expansion joints permit relative sliding movement, rotation, and limited universal movement while constantly providing a fluid-tight seal between the housing 10 and the ball sleeve 11. Regarding the method of making the conduit expansion joints, this method preferably comprising the forming of a split steel die, having a cylindrical bore in one end for receiving a hydraulic plunger, and this bore communicates with a first concentric cylindrical bore, which extends to a second concentric bore, which is partially spherical for forming a ball sleeve in the joint.

The second bore extends to a third concentric cylindrical bore which is of the same size as the first bore, and the die is formed with a closure at the end of the third bore. The method includes the placing of a cylindrical copper tube in the said three bores of the die, and the die is closed, and a filling of resilient rubber of cylindrical shape is placed in the copper tube, and this filling is preferably of smaller diameter than the first and second bores, for greater ease in placement, since the rubber is later to be expanded.

A hydraulic pressure is then exerted on said hydraulic plunger, which acts on the resilient rubber in the copper tube, expanding the rubber inside the copper tube to fill the three bores and the die and forming a ball formation in the copper tube, filling said die. The pressure is then relieved on said plunger, and the die is opened to remove the expanded ball sleeve from the die.

The method preferably includes the forming of the sleeve die with a concentric cylindrical bore at one end which is slightly larger than the copper sleeve used, and this forms a slightly larger bore at one end of the ball sleeve for receiving a pipe to be secured therein, and includes the formation of an annular shoulder in one end of said enlarged bore, against which the pipe may be seated.

The improved method also includes the forming of the split dies for the housing sleeve, which includes forming the split die with a cylindrical bore in one end for receiving a hydraulic plunger, and the bore communicates with a concentric reducing bore for forming an offset in the joint member, and the die has a concentric cylindrical reduced bore communinuating with said reducing bore to form a neck on said joint member. This die is also closed at the end of said reduced bore, and the method includes the placing of a copper tube of the same diameter as the reduced bore in said die, and the placing of resilient rubber of cylindrical shape in said tube, and the filling is preferably of a smaller diameter than the reduced bore in the tube, for convenient insertion of the rubber. Thereafter, a hydraulic pressure is exerted on the plunger which acts on the resilient rubber in the tube, and expands the rubber in the tube in the bores of the die, and expands the tube to fill the die.

Thereafter the pressure on the plunger is relieved, and the dies are opened to remove the expanded joint member from the die.

The method includes the forming of an annular groove in the outer surface of the ball tube adjacent the end of the third bore, and the placing of a resilient butyl rubber wedge seal on the said end of the ball sleeve. The wedge seal is an annular member having a tapered end and a flat end, and a fibrous washer is placed on the ball sleeve engaging the flat end of the wedge seal, with a helical spring on the end of the ball sleeve engaging the fibre washer. The helical spring is tensioned against the flat end of the wedge seal, and a fibre washer is placed against the other end of the spring, and a split ring is mounted in the groove to hold the spring under compression, driving the wedge seal against the ball surface on the ball sleeve.

The outer surface of the wedge seal is preferably grooved with half circular grooves and the grooves are filled with silicone lubricant which engages the inside of the housing sleeve to prevent adherence of the wedge to the inside of the housing sleeve, and a flash coating of chromium is placed on the cylindrical inside of the housing sleeve. The ball sleeve assembly is then inserted in the housing sleeve and the end of the housing sleeve is spun over inward to form a sharp inwardly extending edge of smaller diameter than the ball to act as a stop surface, and hold the joint in assembled position.

The present expansion joints may be manufactured more economically than the devices of the prior art, and will perform their functions for a long period of time without necessity for any repair or replacement.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letter Patent of the United States, is:

1. The method of making a sheet metal conduit expansion joint, which comprises, forming a split die having a cylindrical bore in one end for receiving a hydraulic plunger, said bore communicating with a first concentric cylindrical bore, which extends to a second concentric partially spherical bore, which etxends to a third concentric cylindrical bore of the same size as the first bore, said die being closed at the end of said third bore, placing a cylindrical copper tube in said three bores of said die and closing the die, placing a filling of resilient rubber of cylindrical shape, smaller in diameter than the first and third bores, in said three bores, and exerting a hydraulic pressure on said hydraulic plunger, which acts on said resilient rubber in said bores, expanding the rubber inside said copper tube to fill the three bores of the tube and die, and forming a ball formation in said copper tube filling said die, releasing the pressure on said plunger, and opening said die to remove the expanded ball sleeve from the die.

2. The method according to claim 1, in which the ball sleeve die is formed with a concentric cylindrical bore at one end, slightly larger than the copper sleeve used, forming a slightly larger bore at one end of the ball sleeve for receiving a pipe to be secured therein and forming an annular shoulder in one end of said enlarged bore against which the pipe may be seated.

3. The method of making a sheet metal conduit expansion joint which comprises, forming a split die having a cylindrical bore in one end for receiving a hydraulic plunger, said bore communicating with a concentric reducing bore for forming an offset in the joint member, said die having a concentric cylindrical reduced bore communicating with said reduced bore to form a neck on said joint member, said die being closed at the end of said latter reduced bore, placing a copper tube of the same diameter as said latter reduced bore in said die, closing the die, placing a filling of resilient rubber of cylindrical shape in said tube, said filling being smaller in diameter than said reduced bore in said tube, exerting a hydraulic pressure on the plunger which acts on said resilient rubber in said tube in said bores, expanding the rubber inside the copper tube and expanding the tube to fill the die, relieving the pressure on said plunger, and opening said die to remove the expanded joint housing member from the die.

4. The method according to claim 2, which comprises forming an annular groove in the outer surface of the ball tube adjacent the end of the third bore, placing a resilient butyl rubber wedge seal on said end of the ball sleeve, said wedge seal comprising an annular member having a tapered end and a flat end, placing a fibre washer on said end engaging the flat end on said wedge seal, placing a helical spring on the end of said ball sleeve, tensioning said spring against the flat end of said wedge seal, placing a fibre washer against the other end of said spring and mounting a split ring in said groove to hold the spring under compression and drive the wedge seal against said ball, and which comprises, after making the ball sleeve and the housing member, thereafter placing the ball sleeve as described in claim 2, with its ball end in the joint housing as described in claim 3, with the outer surface of the wedge seal as described in claim 4 slidably engaging the inside of said joint housing.

5. The method, according to claim 4, which comprises prior to the assembly of the ball sleeve, wedge seal, and housing member, grooving the outer surface of the wedge seal, and prior to said assembly filling the grooves with silicone lubricant to engage the inside of the housing sleeve.

6. The method, according to claim 5, which also comprises first providing a flash coating of chromium on the cylindrical inside of the housing sleeve, and thereafter assembling the ball sleeve and housing sleeve as described in claim 4.

7. The method, according to claim 6, which comprises after the insertion of the ball sleeve assembly in the housing sleeve, finally spinning over the end of the expanded housing sleeve to form a sharp inwardly extending edge of smaller diameter than the ball to act as a stop surface.

References Cited in the file of this patent
UNITED STATES PATENTS

| | | |
|---|---|---|
| 2,054,082 | Hufferd | Sept. 15, 1936 |
| 2,742,873 | Moore | Apr. 24, 1956 |
| 2,748,463 | Mueller | June 5, 1956 |